D. G. LILLEY

Aug. 19, 1930. Re. 17,773

GEAR SHIFT MECHANISM

Original Filed July 8, 1927 3 Sheets-Sheet 1

Inventor

Daniel G. Lilley.

By A. J. O'Brien

Attorney

D. G. LILLEY

GEAR SHIFT MECHANISM

Aug. 19, 1930.

Re. 17,773

Original Filed July 8, 1927 3 Sheets-Sheet 2

Inventor

Daniel G. Lilley.

By A. J. O'Brien

Attorney

D. G. LILLEY

Aug. 19, 1930. GEAR SHIFT MECHANISM Re. 17,773

Original Filed July 8, 1927 3 Sheets-Sheet 3

Inventor

Daniel G. Lilley.

By A. J. O'Brien

Attorney

Reissued Aug. 19, 1930 Re. 17,773

UNITED STATES PATENT OFFICE

DANIEL G. LILLEY, OF DENVER, COLORADO, ASSIGNOR TO BENDIX AVIATION CORPORATION, A CORPORATION OF DELAWARE

GEAR-SHIFT MECHANISM

Original No. 1,712,708, dated May 14, 1929, Serial No. 204,366, filed July 8, 1927. Application for reissue filed December 30, 1929. Serial No. 417,576.

This invention relates to improvements in gear shift mechanism for adjusting a rotatable member and has reference more particularly to a mechanism for changing the angularity or pitch of aeroplane propellers while they are revolving.

It has long been recognized that advantageous results will be obtained if the propellers are so constructed that their pitch or angularity can be varied during flight. This will have an effect somewhat analogous to the changing of the gear ratios of an automobile. When the plane is starting and during the climbing period the propellers should be adjusted at such an angle that they will exert the greatest possible tractive power but after the plane has reached the elevation desired, the pitch of the propeller blades should be increased so as to obtain the greatest speed. When the propellers have a fixed pitch, it is evident that the tractive effort can only be increased by varying the speed of the engine. Such an arrangement is comparable to an automobile without means for changing the gear ratio between the engine and the drive wheels.

It is the object of this invention to produce a propeller in which the blades can be rotated about their axes while in motion so as to vary the pitch.

It is a further object to provide a mechanism for rotating the blades which will move them through only a small angle at one time so as to prevent excessive rotation.

A still further object of this invention is to produce a construction of propeller that will give great strength and rigidity to the blades.

The above, and other objects, that may become apparent as the description proceeds are attained by means of a construction and arrangement of parts that will now be described in detail, reference for this purpose being had to the accompanying drawings in which the preferred embodiment of my invention has been illustrated and in which.

Figure 1:
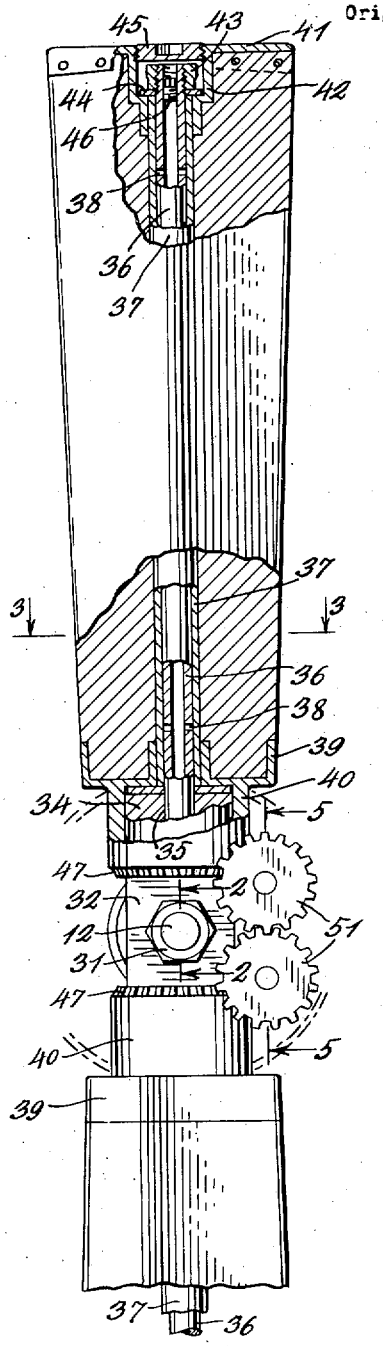
Fig. 1 is an end view of a two-blade propeller, portions having been shown broken away and other portions in section.
Figure 2:
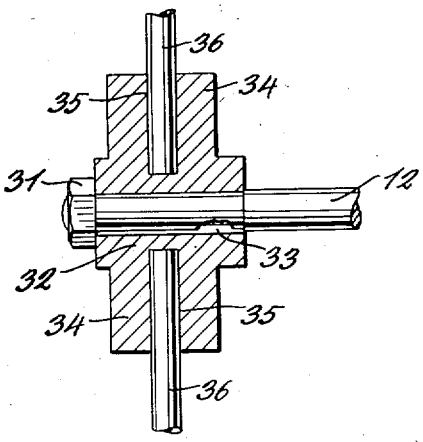
Fig. 2 is a section taken on line 2—2, Fig. 1.

In the drawings numeral 12 designates the crank shaft of the driving motor and for the purpose of this description, this shaft may be considered broadly as a drive shaft and is journalled in the bearing 13. This bearing has a forwardly extending cylindrical hub 14 which is provided with two or more keyways or slots for the reception of keys 15. A friction gear wheel 16 has a hub 17 provided with a bore of the proper diameter to fit the outside of the hub 14 and is held against rotation by means of the keys 15 so that it will slide but not rotate on the hub 14. This gear can be moved along the hub 14 by means of a lever 18 which is pivoted at 19. A connecting rod 20 is pivoted to the lever 18 at 21 and has its other end pivoted at 22 to the end of a bar 23 which passes through an opening 24. This bar has two fingers 25 which embrace the hub 17 and are secured to the latter by means of bolts 26.

It is evident that by means of the lever 18, the gear 16 can be reciprocated and locked in any desired position as the lever 18 has means that co-operates with the rack 27 for holding the parts in adjusted position. The hub 14 has a nut 28 threadedly secured to its end and this provides a stop that limits the forward movement of the gear 16, the rearward movement of which is determined by the engagement of the end of hub 17 with the forward side of part 13.

It will be observed that the gear 16 has two circular conical surfaces 29 and 30. The propeller is secured to the front end of the shaft 12 and is held in place by a nut 31. The propeller consists of a hub 32 which is held against rotation with respect to the shaft 12 by some suitable means such as splines 33. The hub has two diametrically positioned cylindrical projections 34 which have aligned axial openings 35 for the reception of the ends of the hollow steel shafts 36. These shafts form the journals for the propellers which, when made of wood (Fig. 1) have a longitudinal axial opening in which is located the steel tube 37 whose inside diameter is such that it forms a bearing for the journal 36. The shaft 36 has several openings 38 whose function will hereinafter appear. The inner ends of the propeller blades are provided with end caps 39 which have hollow cylindrical hubs 40 that receive the hub portions 34 on which they are rotatable. The outer ends of the blades have caps 41 having an inwardly extending hollow hub 42 into which the outer end of the bearing 37 and the shaft 36 extends. The shaft 36 has is outer end threaded for the reception of the nut 43 whose inner end engages the washer 44 and serves to hold the blade in place. A plug 45 closes the opening in the hub 42. The interior of the hollow shaft 36 is filled with grease which can be forced through the holes 38 by means of the plug 46.

Figure 5:
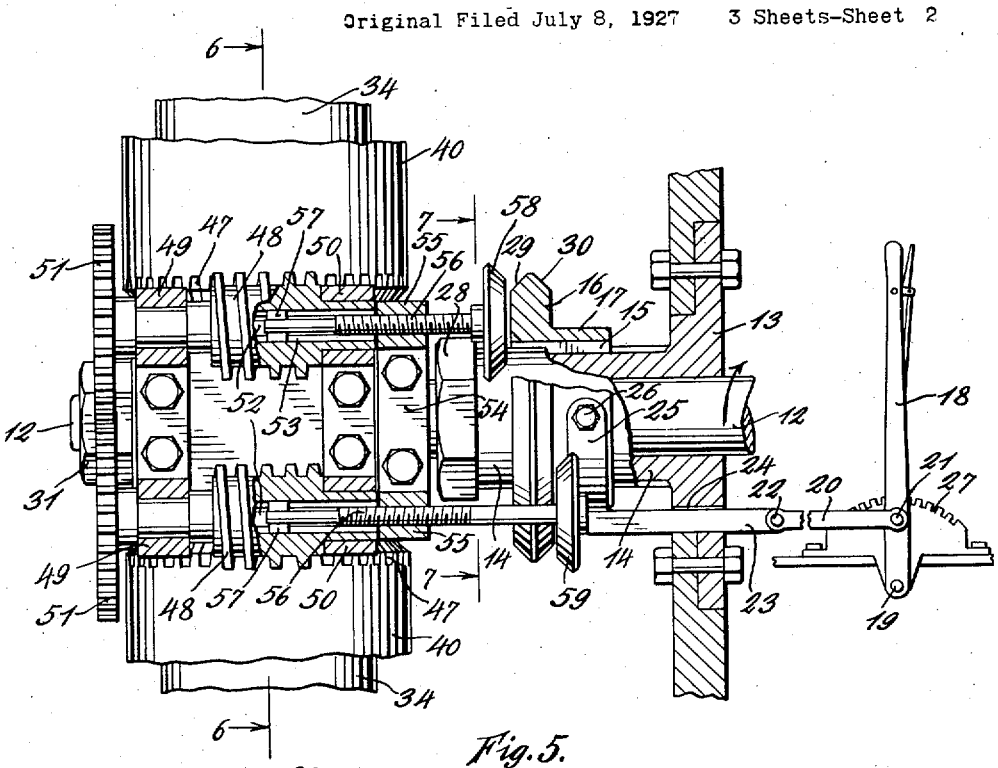
Fig. 5 is an elevation, partly in section taken on line 5—5, Fig. 1.
Figure 6:
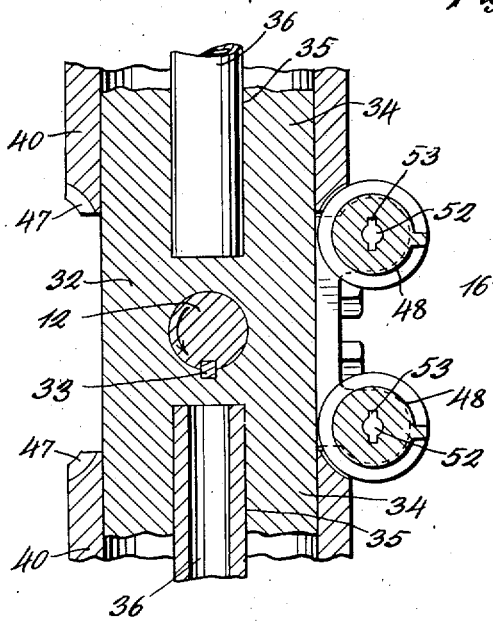
Fig. 6 is a section taken on line 6—6, Fig. 5.
Figure 7:
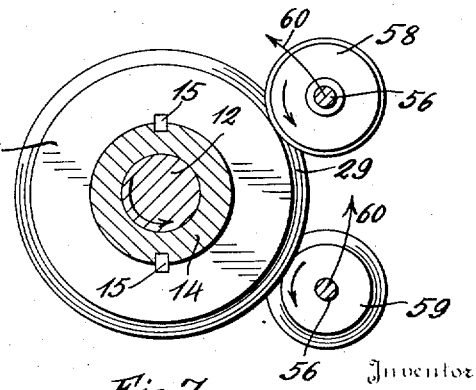
Fig. 7 is a section taken on line 7—7, Fig. 5.

The ends of the cylindrical hubs 40 are provided with teeth 47 which are engaged by the worms 48 (Figs. 5 and 6). These worms, of which there is one for each propeller blade, are journalled in bearings 49 and 50, and are interconnected by means of gears 51 so as to be rotated in unison. In the example shown the worms are both right hand but rotate in opposite directions so that when they are caused to rotate they will turn the propeller blades to increase or decrease the angular pitch. The worms 48 have an axial opening 52 which, in the example shown, has two diametrically located grooves 53. Secured to the hub 32, is a bracket 54 which has two threaded openings 55; these openings are in axial alignment with the openings 52 in the worms. A rod or shaft 56 has a threaded portion which co-operates with the threads in each opening 55 and extends into the opening 52 in the worm. The end within opening 52 has radial projections 57 which engage in the grooves 53 so that shaft 56 may move longitudinally of the worm but will not rotate relative to it. It will be observed that one of the rods has a right hand thread and the other a left hand thread. Secured to the rear end of the rod 56 which has the right hand thread is a bevel friction gear 58 whose beveled face is adapted to coact with the bevel face 29 on gear 16. A similar bevel friction gear 59 is secured to the shaft 56 that has the left hand threads and this is located on the other side of the gear wheel 16 (Figs. 5 and 7). When the propeller is in operation it rotates in the direction of the arrows 60 (Fig. 7).

Let us now assume that shaft 12, to which the hub 32 and the propeller blades are connected, rotates in the direction of the arrows in Figs. 5, 6 and 7; if the handle 18 is moved forwardly (to the left in Fig. 5), the gear 16 will be moved toward the gear wheel 58. When the surface 29 comes into contact with the beveled surface of gear 58, the friction will cause the latter to rotate in the direction of the arrow (Fig. 7). The rotation of wheel 58 will cause both of the worms to rotate and these, in turn, will rotate the propeller blades about the hollow shaft 36. It is evident that unless some special means were provided to prevent it, that the propeller blades would be rotated through too great an angle as it would be impossible for the operator to determine just when to disconnect the gears. I have, therefore, mounted the gears 58 and 59 on shafts 56 that have a threaded connection with their bearings. When the wheel 58 is rotated by being brought into contact with the wheel 16, the shafts 56, to which the gears 58 and 59 are connected, will move forwardly (to the left in Fig. 5) and this will separate the friction surfaces on the wheels 58 and 16. It is therefore possible to rotate the blades through a small angle only at each setting of the lever 18 and each setting of lever 18 will therefore correspond to a certain pitch of the propeller blades. When the lever 18 is moved towards the right, the gear 16 will come into contact with the beveled surface of the gear 59, the blades will be rotated in the opposite direction. The left hand thread on the shaft to which the gear 59 is connected will cause the contact between gear 59 and the surface 30 to be broken after a small angular change has been effected in the position of the blades.

I consider the mechanism just described as of great importance in adjusting the angularity of moving propeller blades as it permits only a limited adjustment to be made. It may be possible to apply a constant force to the handle 18 so as to cause the gear 16 to follow the gears 58 and 59 and thereby make the maximum angular adjustment at one time. The limit of the adjustment in either direction is determined by the extent of the movement of gear 16 on hub 14 and as positive stops are provided to limit this movement in both directions, the angularity of the propellers can only be adjusted between certain well defined limits. The position of the handle 18 determines the pitch of the propellers and the notches 27 in the quadrant can therefore be calibrated so that the operator can set the blades to any angle desired.

Figure 3:
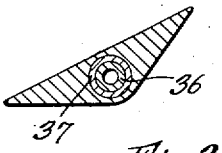
Fig. 3 is a section taken on line 3—3, Fig. 1.
Figure 4:
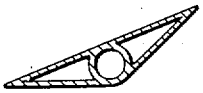
Fig. 4 is a section similar to that shown in Fig. 3 but showing a different form of blade construction.

In Figs. 3 and 4, I have shown cross sections of two different blade constructions, the one shown in Fig. 3 being of a solid construction and adapted for wooden blades, while the one shown in Fig. 4 is better suited for a metal construction.

Figure 9:
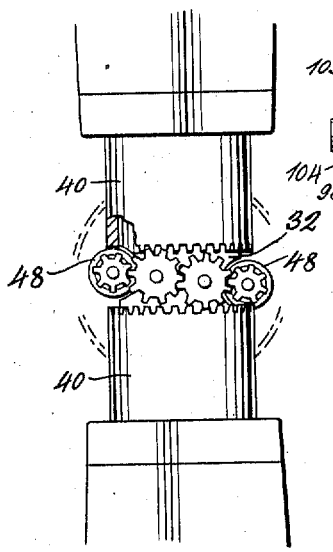
Fig. 9 is a view similar to that in Fig. 1 and shows a modified form of construction.

In Fig. 9 I have shown how the worms 48 may be located on diametrically opposite sides of the shaft 12 so as to obtain a balanced effect.

Figure 8:
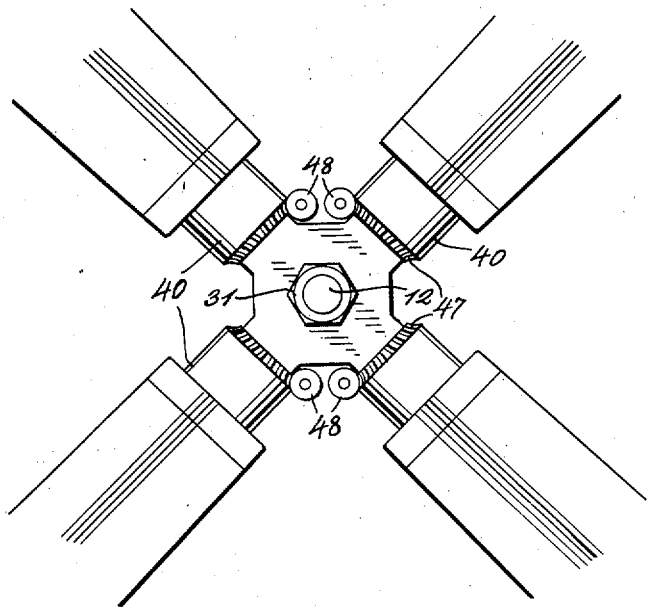
Fig. 8 is an end elevation of a propeller having four blades.

In Fig. 8, I have shown how the invention is applied to a propeller having four blades.

The worms and gears may, of course, be enclosed in a suitable sheet metal housing which has not been shown, but which has been indicated by dotted lines in Fig. 9.

Figure 10:
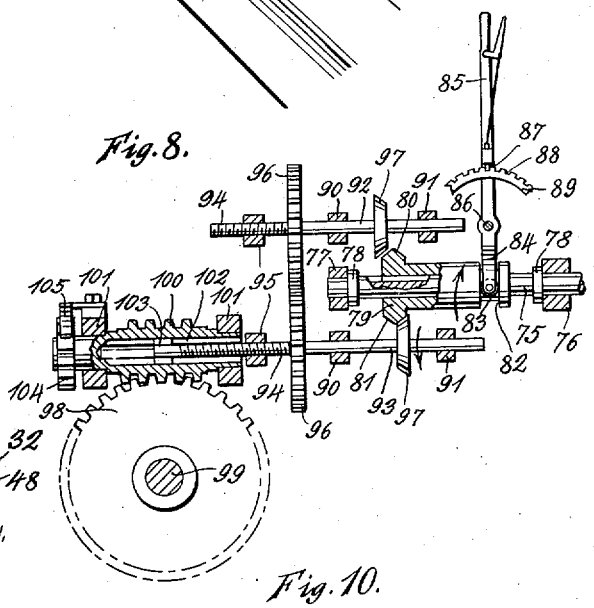
Fig. 10 is a view showing how the device may be altered so as to obtain an arrangement in which the driving gear rotates about its own axis and in which the driven gears do not rotate about the axis of the driving gear.

In Figure 10 I have shown a modification in which the shaft 75 is the power shaft and is rotated by some means not shown. This shaft has been shown as journalled in bearings 76 and 77. Collars 78 hold the shaft against longitudinal movement. Slidably but nonrotatably mounted on shaft 75 is a drive gear 79 which is provided with two friction power transmission surfaces 80 and 81. The drive gear has an elongated hub that is provided with an annular groove 82 within which is a roller 83 that is secured to the lower end 84 of the handle 85. This handle is pivoted at 86 and is provided with a pawl 87 that co-operates with the notches 88 on the quadrant 89. By means of the lever 85 the drive gear can be moved longitudinally on shaft 75 and latched. Rotatably mounted in spaced bearings 90 and 91 are shafts 92 and 93. These shafts are provided with a threaded portion 94 which is engaged by a threaded bearing 95. The threads on shaft 92 are left hand and those on 93 are right hand. Each shaft has secured to it a spur gear 96 and a friction gear 97. The friction gear on shaft 92 is so located that it will engage the surface 81, while the corresponding gear on shaft 93 may engage surface 80. The threads at 94 are preferably of the same pitch and gears 96 of the same pitch diameter so that whenever shafts 92 and 93 are rotated they will move longitudinally at the same rate and therefore the distance between the wheels 97 will always remain the same. Gears 97 are so located that only one of them can come into contact with the surfaces 80 or 81 at the same time, and are also spaced apart so far that wheel 79 can rotate freely.

It is now evident that if shaft 75 is rotated in the direction of the arrow and handle 85 moved so as to bring the surface 80 into contact with the corresponding surface on wheel 97 which will therefore rotate in the direction indicated by the arrow and as this rotation moves wheel 97 out of contact with the drive wheel only a very limited movement of shafts 92 and 93 can therefore be effected by a single setting of the drive wheel. If the drive wheel is moved towards the left, it will contact with the gear on shaft 92 and the operation will be the same with the exception that the parts will rotate in the opposite direction.

This mechanical movement can obviously be used for many purposes and as an example I have shown a worm wheel 98 that is rotatable about the axis of shaft 99 to which it may be attached. A worm 100 is mounted for rotation in bearings 101 and is provided with a noncircular opening 102 which is engaged by the corresponding noncircular end 103 of shaft 93 which is therefore slidably but nonrotatably connected with the worm. The wheel 98 may control a gun or any other mechanism. Secured to the end of the worm 100 is a noncircular wheel 104 which is acted upon by a spring pawl 105 that serves to latch the worm against any accidental rotation.

From the above it will be apparent that I have produced a device by means of which the angularity of propeller blades may readily be altered while the propellers are in motion and which makes it possible to rotate them a few degrees at a time until the desired pitch is obtained and to determine by the control lever just what angular position the blades have.

It is evident that the mechanism employed is suitable for any place where the position of a movable member is to be altered while in motion as well as where it is desirable to move any movable member in such a manner that all danger of moving it any excessive distance is obviated and as another example attention is called to a regulating device for a water wheel or similar machine.

While several illustrative embodiments have been described in detail, it is not my intention to limit the scope of the invention to those particular embodiments, or otherwise than by the terms of the appended claims.

What is claimed is:

1. In a device of the class described, in combination, a friction gear wheel having a friction surface on each of its sides, a friction gear wheel located on each side of the first mentioned wheel, said last named wheels being normally out of engagement with the friction surfaces on the first mentioned wheel, the first mentioned wheel and the other two wheels being relatively movable, means for moving the first mentioned wheel into contact with either one of the other two whereby they will be rotated and means for automatically moving the friction gears out of operative engagement after the second mentioned wheels have rotated a predetermined amount.

2. A device of the class described, comprising in combination, three power transmission gear wheels one of which has a friction surface on each side, the other two gear wheels comprising a pair, being located one on each side of the gear having the two power transmission surfaces, means for interconnecting the gears of the pair so that they rotate in unison, means for simultaneously causing the two wheels comprising the pair to move along their axes of rotation when they rotate and means for moving the gear wheel having the two surfaces into engagement with either one of the wheels of the pair whereby they will be rotated about and moved along their axes of rotation.

3. A device of the class described comprising, in combination, a gear wheel having a power transmission surface on each of its sides, a pair of gears each provided with a power transmission surface adapted to cooperate with one of the corresponding surfaces on the first mentioned wheel, said last mentioned wheels being mounted for rotation about spaced parallel axes, means for interconnecting the two last mentioned wheels so that both will be rotated simultaneously in opposite directions whenever one of them is rotated, means for causing both of said wheels to move simultaneously and at the same rate along their respective axis of rotation whenever they are rotated, and means for moving the first mentioned gear wheel into operative engagement with either one of the other two and means for producing relative rotation between the first named gear and the other two whereby the two interconnected gears will be caused to rotate about their axes and moved longitudinally of their axes of rotation.

4. A device of the class described, comprising, in combination, two parallel spaced shafts, means for positively interconnecting the shafts so that they will rotate simultaneously in opposite directions, bearings for said shafts, said shafts each having a threaded portion, a threaded member operatively associated with each threaded portion, a gear wheel on each shaft, each of said gears having a power transmission surface, a drive gear located between the other two gears, said drive gear having two power transmission surfaces, each of which is adapted to co-operate with the power transmission surface on one of the other gears and means for moving the drive gear into operative engagement with either one of the other two gears.

5. In a device of the class described, in combination, a bearing, a shaft rotatably mounted in said bearing, a member carried by the shaft and adapted to be moved relative thereto, means for moving said member with respect to the shaft while both revolve about the axis of the shaft and means including longitudinally movable members for automatically rendering said moving means inoperative after it has effected a predetermined amount of movement of said member.

6. A device of the class described comprising, in combination, a bearing, a shaft mounted for rotation therein, a member secured to the shaft so as to revolve with the shaft, an axle extending radially of the shaft and perpendicularly to the axis of the shaft, said member being mounted on said axle, means for rotating the member on the last named axle while it is revolving about the axis of the shaft and means including longitudinally movable members for automatically rendering the rotating means inoperative after it has rotated the member through a predetermined angle.

7. In a device of the class described, means for varying the pitch of a revolving member which is rotatable on an axle comprising, a worm, gears for rotating the worm, manually operated means for moving the gear members into operative position and automatic means including longitudinally movable members for moving the gear members into inoperative position as the revolving member is rotated.

8. In a variable gear mechanism having a bearing, a shaft rotatable in said bearing, a hub secured to one end of said shaft, a journal extending radially from said hub and a member rotatably mounted on said journal, means for rotating the member on its journal while it is revolving about the axis of the shaft, said means comprising a worm gear connected with the member and concentric with the axis of the journal about which the member rotates, a worm cooperating with said worm gear, a gear wheel nonrotatably secured to said bearing, means for moving said gear wheel longitudinally of said bearing, a gear wheel nonrotatably secured to said worm, said second named wheel being so positioned that it will be engaged by the first-mentioned gear wheel when the latter is moved longitudinally on the bearing whereby it will be rotated by the latter and means for moving said second named gear wheel away from the gear wheel on the bearing when it is rotated by the latter whereby the operative connection between the two is broken.

9. In a variable gear mechanism having a bearing, a shaft rotatable in said bearing, a hub secured to one end of said shaft, journals extending radially from said hub and members rotatably mounted on said journals, means for rotating the members on their journals while they are revolving about the axis of the shaft, said means comprising a worm gear attached to each member and concentric with the axis of the journal about which the members rotate, a worm co-operating with each of said worm gears, a friction gear wheel nonrotatably secured to said bearing, means for moving said gear wheel longitudinally of said bearing, a shaft slidably but nonrotatably secured to each worm, a stationary bearing for each of said shafts, said shafts having a threaded connection with its bearing whereby it may move longitudinally of its axis as it is rotated, a friction wheel secured to each of said shafts, said wheels being located on opposite sides of the nonrotatable gear wheel so that they will be moved into operative engagement with said friction gear wheel when the latter is moved longitudinally and means for moving the friction gear wheel into operative relation with respect to either of said friction wheels.

10. A gear shift mechanism comprising, in combination, a bearing, a shaft rotatable in said bearing, a hub secured to one end of said shaft, a journal extending radially from said hub, a member rotatably mounted on said journal, means for rotating the member on its journal while it is revolving about the axis of the shaft, and means including longitudinally movable members for automatically rendering said rotating means inoperative.

11. Mechanism of the character described comprising a rotatable shaft, a plurality of propeller blades carried by said shaft and rotatable therewith, and means for varying the pitch of said blades during rotation thereof, said means including friction wheels one for each blade mounted eccentrically with respect to said shaft and rotatable therewith, a nonrotatable friction member arranged concentrically of said shaft and normally disengaged from said wheels and means for moving said nonrotatable friction member into frictional engagement with said wheels to cause relative rotation of said blades with respect to said shaft.

12. In an aeroplane propeller, a rotatable shaft having a hub drivably attached thereto, a plurality of blades carried by said hub and rotatably mounted therein with respect thereto, a plurality of spirally threaded shafts, one for each blade and co-operating therewith, said shafts being drivably connected together, a friction wheel disposed eccentrically of said rotatable shaft and drivably connected with each screw shaft and means comprising a longitudinally movable member for exerting a frictional drag on one of said wheels to cause relative rotation between said shafts and hub to thereby change the pitch of said blades.

13. In an aeroplane propeller, a rotatable shaft having a hub drivably connected therewith, a plurality of blades carried by said hub, and means for angularly adjusting said blades with respect to said hub during rotation of the latter, said means including a threaded member co-operating with each blade and carried by the hub, means drivably connecting said threaded members together, a friction wheel drivably connected to each threaded member and arranged eccentrically of said shaft and means arranged concentrically of said shaft for frictionally engaging said wheels to cause angular adjustment of said blades with respect to said hub.

14. In combination, a rotatable shaft, a hub drivably connected to said shaft, a propeller including a plurality of blades carried by said hub and rotatable therewith, an annular gear carried by each blade, a plurality of threaded shafts rotatable with said hub and operatively associated with each gear, a friction wheel arranged eccentrically with respect to said shaft and drivably connected to each of said threaded shafts, and means for frictionally engaging said wheels to cause relative rotation between said blades and hub during rotation thereof to thereby change the pitch of said blades.

15. In a device of the character described, in combination, a bearing, a shaft rotatable therein, a hub drivably connected to said shaft, a plurality of propeller blades carried by said hub, and means for angularly adjusting said blades during rotation thereof, said means including interconnected gear members arranged eccentrically of said hub and carried thereby, and relatively stationary means concentrically disposed with respect to said hub and selectively movable into engagement with either of said members whereby to effect relative movement between said hub and members.

16. In apparatus of the class described, a rotatable shaft, a hub drivably secured to said shaft, blades carried by said hub for rotation with the shaft, said blades being angularly adjustable relative to said hub and shaft, gears carried by said blades, and means for rotating said gears to angularly adjust the blades relative to the shaft and vary the pitch of said blades, said means including a normally stationary friction member surrounding said shaft, means for moving said friction member in either direction longitudinally of said shaft, and friction means separately drivably connected to each of said gears and adapted for engagement with said longitudinally movable friction member, said friction means being rotatable with said shaft.

17. In apparatus of the class described, a rotatable shaft, a member drivably connected to the shaft and rotatable therewith, means for mounting said member on the shaft, said mounting means permitting angular adjustment of the member about an axis disposed substantially at right angles to the axis of rotation of the shaft, and means for adjusting said member relative to said axis, said last named means including a normally stationary friction member having a pair of friction surfaces, a pair of rotatable friction elements adapted to engage said normally stationary friction member, said friction elements being rotatable with the shaft, means including threaded members for drivably connecting the friction elements and the angularly adjustable member, and means for moving the friction member in either direction longitudinally of the shaft to engage said friction elements.

18. A device of the class described comprising a rotatable shaft, a plurality of propeller blades, means for drivably connecting said shaft and blades, means for varying the pitch of said blades during operation thereof, and means including members longitudinally movable with respect to said shaft for predetermining the extent of movement of said pitch varying means.

In testimony whereof I have signed this specification.

DANIEL G. LILLEY.